2 Sheets—Sheet 1.

W. S. BARNARD.
Corn-Harvester.

No. 223,213. Patented Jan. 6, 1880.

Witnesses:
Donn I. Twitchell
Will. W. Dodge.

Inventor:
W. S. Barnard
By his attys.
Dodge & Son

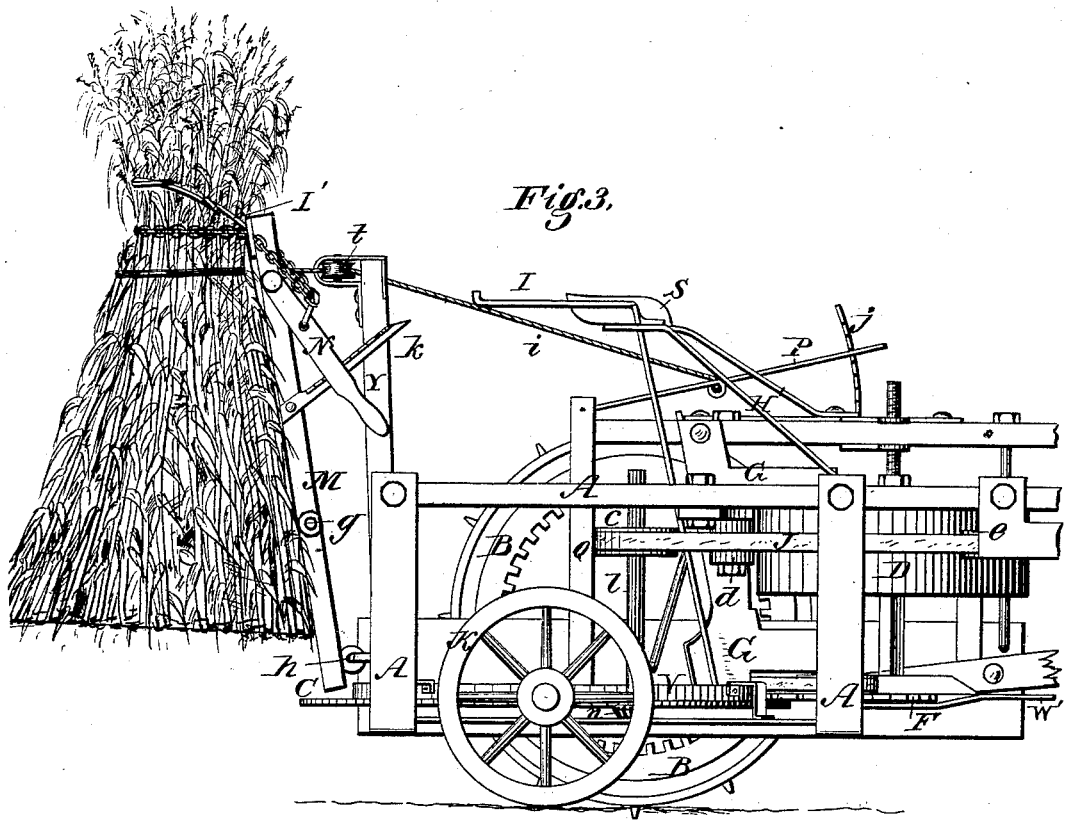
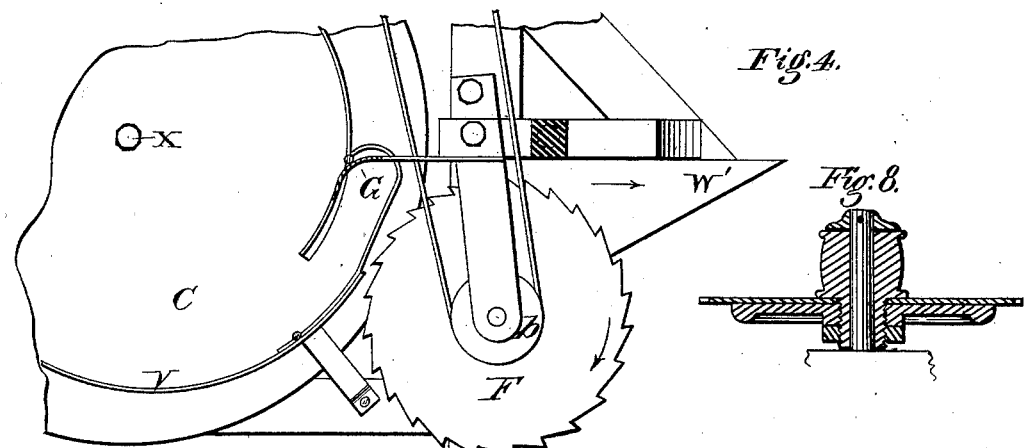
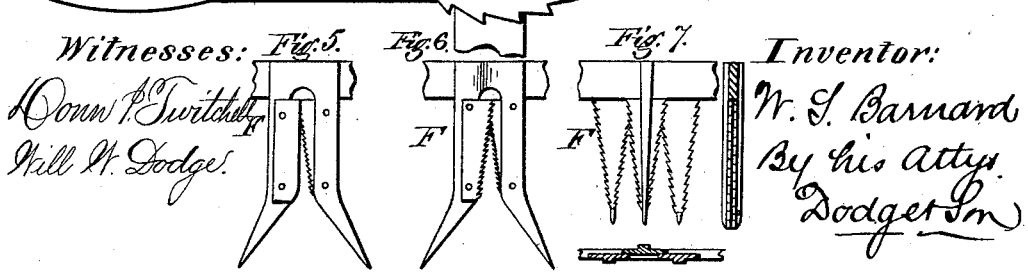

UNITED STATES PATENT OFFICE.

WILLIAM S. BARNARD, OF CANTON, ASSIGNOR OF ONE-HALF OF HIS RIGHT TO WM. A. KNOWLTON, OF ROCKFORD, ILLINOIS; SAID KNOWLTON ASSIGNOR OF ONE-HALF OF HIS RIGHT TO SAID BARNARD.

CORN-HARVESTER.

SPECIFICATION forming part of Letters Patent No. 223,213, dated January 6, 1880.

Application filed January 26, 1878.

*To all whom it may concern:*

Be it known that I, WILLIAM STEBBINS BARNARD, of Canton, in the county of Fulton and State of Illinois, have invented certain Improvements in Machines for Harvesting and Shocking Corn, &c., of which the following is a specification.

My invention relates to machines for cutting and bundling or shocking corn, cane, &c.; and the improvements consist in the peculiar construction and arrangement of the various parts, as hereinafter described.

Figure 1:
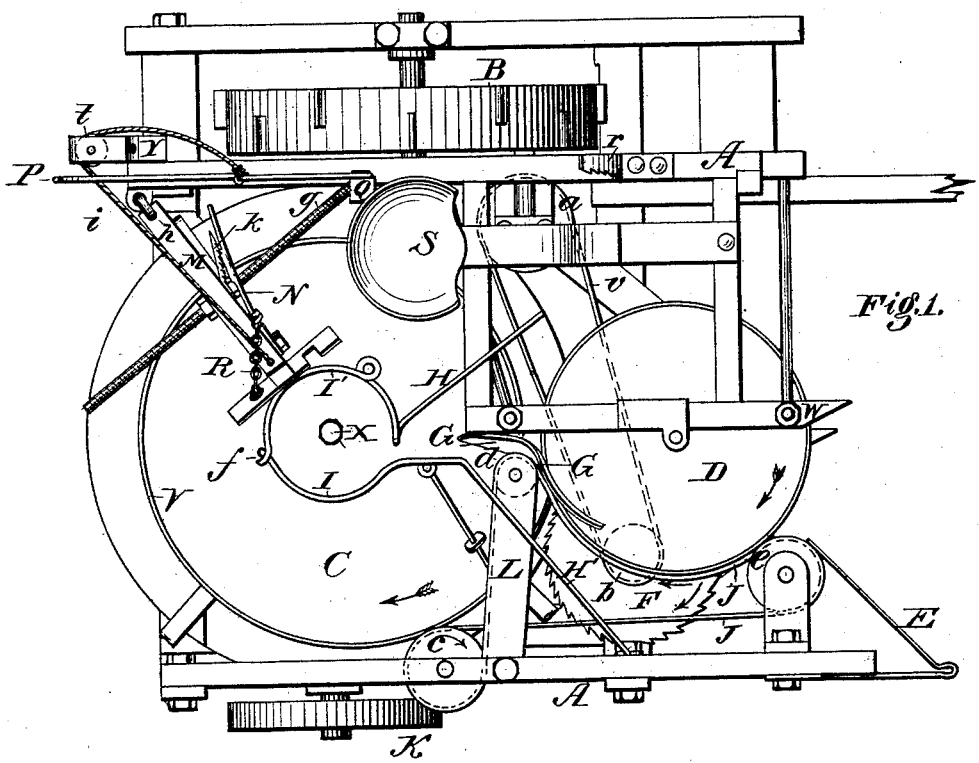
Figure 2:
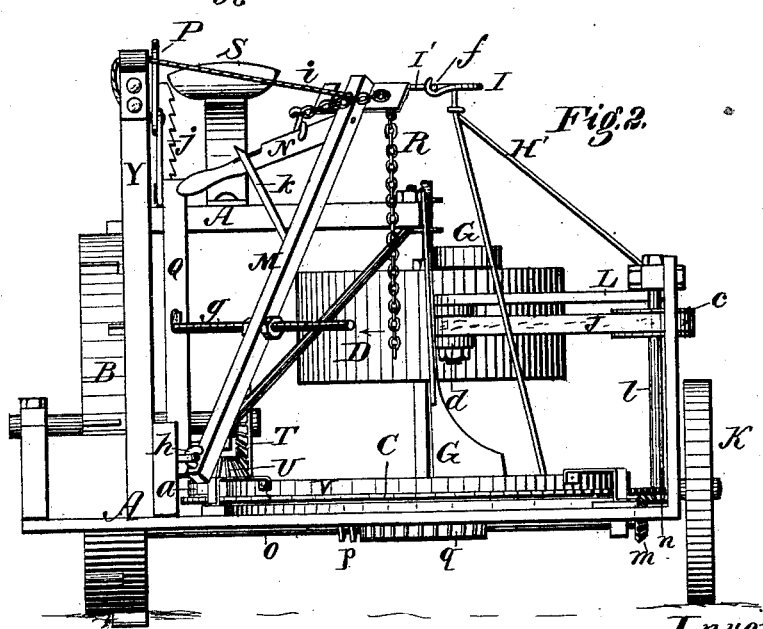

In the drawings, Figure 1 represents a top-plan view of my machine; Fig. 2, a rear elevation of the same; Fig. 3, a side elevation; Fig. 4, a plan view of the revolving cutter and a portion of the revolving bed or platform, together with the guide by which the stalks are directed to said platform; Figs. 5, 6, and 7, different forms of cutters; Fig. 8, a sectional view, showing the combination of a circular saw, &c., with a hollow hub and a stationary pivot.

In constructing the machine, I provide a strong frame, A, of suitable form and materials, and mount the same upon wheels—preferably two, B and K, one at each side, the former being a drive-wheel, as shown in Fig. 3.

The machine is provided at its forward end with elevated gathering-arms E and W, and with a lower gathering or guide arm, W', by which the stalks are directed toward the cutter, or toward the devices by which they are grasped, carried, &c.

Below the gathering-arms E and W, I mount a rotary cutter, F, with reversed teeth, as shown in Fig. 4, said cutter mounted on a stationary pivot, and receiving a rotary motion from a belt, v, passing around the pulleys a and b, the former of which receives motion from the drive-wheel B through the bevel-gear wheel T and pinion U, as shown in Fig. 2.

Higher than the cutter F is a drum or wheel, D, driven by a band, J, which, in turn, receives its motion from a pulley, c, it being carried around said pulley and pulleys d and e, as shown in Fig. 1, the whole arranged and located so that the band J bears against a part of the face of the drum or wheel D from a point just in advance of the cutter to a point in the rear; or two or more such bands may be applied, one above another, on the face of the large drum or wheel D, so as to grasp the stalks in two or more places, if desired. This apparatus may be arranged in a horizontal plane, or in a somewhat inclined plane. Its objects will be explained farther on.

Nearly backward from the cutter F is mounted a rotary bed or platform, C, upon a central stud or bearing, x, said platform preferably extending nearly across the machine, as represented in Fig. 1, and with the cutter F lapping slightly over the edge of the platform C, as shown in Fig. 4.

The relative position of the cutter from the platform may be higher, or backward, or lower, if desired.

The bed or platform C is caused to rotate by means of a face-gear attached beneath it, and operated by a worm-gear, p q, secured upon a shaft, o, passing transversely, and having a driven pinion gearing with the drive-wheel B at one end, and at the other end a miter-gear, m, meshing with its fellow, n, on the lower end of a vertical shaft, l, which also carries the pulley c, which drives the belt J, and thereby its pulleys d and e and the drum or wheel D, as previously mentioned.

As the machine advances, the stalks are caught by the gathering-arms E, W, and W', and directed by their inclined sides to the point at which the band or belt J meets the drum or wheel D.

The belt and drum move in the direction indicated by the arrows in Fig. 1, and it will thus be seen that the stalks upon reaching this point will be drawn in, in a standing position, between the drum and belt, and thereby their weight and position sustained while being severed and carried around the cutter-pulley and back until they come in contact with the curved guides G and H at points above and below the belt or band J.

When the stalks are clamped against the nearly-vertical face of the drum or wheel D they can only lean in planes tangential to its face, and are thus carried against guides G and H in such a manner as to erect them entirely, so they always enter the shocker in order.

It will be seen by reference to Fig. 1 that the stalks upon entering guides G and H leave the drum or wheel D, and also that the guides G conform nearly to the exterior surface of the pulley d, around which the belt J passes on its way back to the operating-pulley c, but passes beneath the rear edge of said pulley, so that as the stalks move into the guide G they cannot tip forward, but will naturally follow around with the pulley d, with which they are in contact, and are tipped backward over the low rear part of said guide into the converging arms or guides H H', by which they are directed through the spiral entrance above into the former I, while their bases, resting upon the platform in the base-spiral entrance, are carried entirely into the base-spiral by rotation of the platform. The stalks are thus carried over the cutter F, and these feeders may be arranged in such a plane, inclined somewhat upward, as would elevate the stalks above the cutter and to the platform, even if the platform were arranged a little higher than the cutter.

The stalks are conducted against the guides G through the spiral entrance above and below onto the revolving platform C, on which the butts rest, and by which they are carried around, and the shock or bundle is formed by the action of the revolving platform in connection with the stationary spirals V and I, guides G, drum or wheel D, and band J, which deposit the stalks in a spiral layer.

The shock is formed hollow at its base, and one action of the spirals is to compress it more and more, continually; also, to prevent the stalks from moving off over the edge of the bed or platform C, and to guide and retain the entering stalks and those within, the lower stationary guide, V, has considerable vertical width, and is secured just above the bed, a short distance within the circumference of the same. At the point where the guide G is located the ends of the spiral guide V are apart and extended past each other, forming an entrance, as shown in Fig. 4, the inner end being secured, preferably, to the guide G, and the part behind the cutter being cut away entirely, or, preferably, flush with the upper face of the cutter F, to allow the stalks to pass freely into or over it. When the bases of the stalks are stood in this entrance, upon the rotary platform, its rotation carries them into the spiral and around in the shock.

The spiral former I, in which the tops of the bundles or shocks are made up, as above described, consists of two segments, connected by a catch, and attached, respectively, one to the frame at one side of the machine, and the other to an erectile swinging arm or beam, M, connected at its lower end to or near a vertical or inclined post, Y, (on the rear of the frame,) by means of a joint, h, and being sustained by its spiral segment resting in a catch, and, further, by the cross-arm which it bears, having one end sustained in a notch in the frame, as at Q, or otherwise; also by a cord, i, passing around a pulley, t, secured to the post Y, and thence to a pry-lever, P, as hereinafter more fully noticed.

The two segments I and I' meet and form a spiral nearly concentric with the platform C, and about parallel with the base-spiral V, the segments being locked together when in this position by means of their catch on the rear side, as shown at f, Figs. 1 and 2. At the forward side the narrow spiral entrance admits the stalks, and diverges therefrom in guiding-arms H H', to direct the stalks into the former, as shown.

When the bundle or shock is formed, a device is necessary by which the bundle may be compressed and held while being bound, and also by which it may be secured to the swinging arm or beam M, in order that it may be swung around to the rear of the machine to be dropped therefrom. To this end I construct a compressor, R, consisting of a chain, or its equivalent, having one end secured to a pry-lever, N, and having the other end free or hung, preferably, near the top spiral entrance, so as to form a loop, open at said entrance, that the shock or bundle may be collected inside of the loop as well as inside of the shocker, and the free end may be passed to and attached to the lever N by a hook or otherwise, when the bundle or shock may be compactly pressed by bearing down the pry-lever N, and may be so held by locking the lever in a lever-catch, k.

In order to discharge the bundle or shock from the machine, the compressor is secured to the swinging arm or beam M, as before stated, so that when the shock or bundle is compressed it may be lifted and swung with the arm M to the rear of the machine, and the shock or bundle released by uncatching the lever N, and thus loosening the compressing-band R, when the shock or bundle is free to fall out.

The method of hanging the arm M by cord i passing around its rear side before attaching, and the forward attachment of the arm at its base, help to cause the arm and shock to swing to the rear by their own weight and the tension of the cord when the pry-lever P is operated, as above specified.

In order that these devices may all be operated by the driver they are arranged convenient to his seat S, and a pry-lever, P, is arranged near him and connected with the erectile swinging beam M by means of a cord, i, or its equivalent, passing around the pulley t, secured to the vertical or inclined post Y, so that when the spiral segments I are disengaged from one another and the pry-lever P is operated, the beam M shall be drawn upward and backward until the whole weight of the shock is thrown onto the hinge, when, by reason of its mode of hanging and the weight of itself and the shock, and the direction of the cord i, it will swing around with the shock or bundle which it carries to the position shown in Fig. 3. While in this position it is only necessary to release the pry-lever N, when, as previously stated, the shock or bundle is free to fall. Falling in an erect position and having a large base, the shocks or bundles will remain standing as they fall from the machine. After depositing the shock the beam and its attendant devices are brought again to their former position, ready to receive another shock or bundle; and, in order to guide the beam M in its movements, and also to steady it when in position to receive a fresh shock or bundle, and also for the shock to hang against when elevated, a cross-arm, $g$, is arranged to extend from the beam M, and has one end held in a notch, as shown in Figs. 1 and 2. This arrangement gives a proper direction to the first part of the movement of the lifting-beam M, controlling the same.

In order that the band J and pulley $e$ may adjust themselves to the quantity of stalks or ears between them and the drum or wheel D or guide G, the pulley $e$ is mounted on a hinged or adjustable arm, L, as shown in Figs. 1 and 2, which allows passing material to push the pulley and band from the drum or wheel, while the tension of the band pulls the pulley and itself toward the drum; also, the foremost pulley, $d$, may be mounted likewise on an adjustable arm, if desired.

Although the description of the machine thus far has been confined to one employing rotary or revolving cutters, I do not wish to be understood as confining myself to the use of such, as in some instances stationary cutters are preferred.

When the stalks are green and tender, or when they are not firmly rooted, a revolving cutter may be more advantageously employed than a fixed one; but when the stalks are firmly rooted and possess sufficient strength to sustain themselves against the pressure of the advancing cutter until the severing is completed, stationary cutters may be profitably employed.

In constructing such cutters I embody in them, preferably, the same principle with reference to the teeth that I have described in connection with the revolving cutter—that is to say, the teeth are the reverse of common saw-teeth, being inclined backward; or the teeth may be like ordinary saw-teeth. These cutters should be drawn at a cutting angle with the row, and may be various in combination and form, as described, and also as represented in Figs. 5, 6, and 7, in which Fig. 5 shows one plane surface and one toothed edge, the two being so arranged as to form a converging passage, into which the stalks pass and are gradually cut. Fig. 6 represents two arms similarly arranged, both having toothed edges; and Fig. 7, a series of toothed edges combined. The first two forms, Figs. 5 and 6, should be provided with gathering-arms to direct the stalks to the cutter; but the last-mentioned form—that shown in Fig. 7—may not require them.

The cutters are arranged to lie, preferably, one above another, as shown in Fig. 7, in order that the stalks shall not clog or choke up between them.

I do not wish to be understood as limiting myself to the use of only backwardly-inclined teeth in these, but teeth of any sort may be used; yet, by giving the teeth an inclination backward they are prevented from hooking or becoming lodged in the fibers of the stalks, the teeth clearing themselves and having a shear-cut instead of a hooking or tearing action, which is the case when the usual form of saw-teeth is used.

It will be seen that the cutters have the inclined sides of their teeth sharpened to do the cutting, and that consequently the teeth form, in effect, a series of small inclined knives, which present their edges obliquely against the stalks in such manner as to act with a drawing or shearing cut.

If desired, the drum or wheel D, band J, or pulley $d$ or $e$ may, one or more of them, be provided with a face or facial ridges roughened by points or notches, or otherwise, to assist in feeding the stalks or sustaining their weight or position.

In practice, other means may be employed for hanging the beam M than the eye $h$, (shown in the drawings;) but this is considered preferable, as it admits of a free movement of the beam in all directions in which it is required to move, and is strong, cheap, and simple.

Having thus described my invention, what I claim is—

1. The combination of the rotary table, the cutter, the devices for conveying the stalks from the cutter to the table, the guard above the table, and the separable formers I I'.

2. In a harvesting-machine, a shocking mechanism consisting, essentially, of a horizontal rotating table and two spiral guides and retainers, I, I', and V, each with an inlet-opening in one side, and located substantially as described.

3. In combination with the conveying mechanism and the shocker, with its guard rim or former V, the guide G, constructed and arranged substantially as shown.

4. The combination of the compressing device with the upper end of a swinging bar, M, secured at its lower end by a swivel-joint.

5. In combination with the post Y and bar M, provided with compressing devices and swiveled at its lower end, the rope or chain $i$ and pry-lever P.

6. In combination with the swinging bar M, arranged as and for the purpose described, the arm $g$ and its notch Q.

7. In a corn-harvester, the combination of drum D, conveyer-belt J, fixed pulleys $e$ $c$, and pulley $d$, mounted in the swinging arm L, the free end of which is presented to the drum, as shown.

WILLIAM STEBBINS BARNARD.

Witnesses:
CHAS. LOUGHRIDGE,
RICHD. F. WAY.